US012654660B2

(12) United States Patent (10) Patent No.: US 12,654,660 B2

Yoshizawa (45) Date of Patent: Jun. 16, 2026

(54) DRIVING SUPPORT DEVICE FOR VEHICLE AND METHOD FOR THE SAME

(71) Applicant: DENSO CORPORATION, Kariya-city (JP)

(72) Inventor: Shin Yoshizawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 311 days.

(21) Appl. No.: 18/187,596

(22) Filed: Mar. 21, 2023

(65) Prior Publication Data

US 2023/0219541 A1 Jul. 13, 2023

Related U.S. Application Data

(63) Continuation of application No. PCT/JP2021/036216, filed on Sep. 30, 2021.

(30) Foreign Application Priority Data

Oct. 7, 2020 (JP) ................................. 2020-170067

(51) Int. Cl.
*B60T 8/172* (2006.01)
*B60Q 9/00* (2006.01)
(Continued)

(52) U.S. Cl.
CPC ................ *B60T 8/172* (2013.01); *B60Q 9/00* (2013.01); *B60T 7/22* (2013.01); *B60T 8/58* (2013.01);
(Continued)

(58) Field of Classification Search
CPC ... B60T 8/172; B60T 7/22; B60T 8/58; B60T 2201/022; B60T 2210/10; B60T 2210/32;
(Continued)

(56) References Cited

U.S. PATENT DOCUMENTS

2005/0228587 A1* 10/2005 Kobayashi ........... G06V 20/588
382/104

FOREIGN PATENT DOCUMENTS

JP 2006244395 A 9/2006
JP 2013082382 A 5/2013
(Continued)

OTHER PUBLICATIONS

English Machine Translation of JP-2015232787-A (Year: 2015).*

*Primary Examiner* — Andrew J Cromer
(74) *Attorney, Agent, or Firm* — Harness, Dickey & Pierce, P.L.C.

(57) ABSTRACT

A control device in one aspect of the present disclosure includes a vehicle information acquisition unit, an obstacle information acquisition unit, and a sudden braking detection unit, and controls a warning information transmission unit to transmit, to an other vehicle, warning information including obstacle information when a sudden braking is performed by a subject vehicle. When receiving the warning information from the other vehicle, a target vehicle determination unit confirms that the other vehicle is a warning target vehicle, and a risk calculation unit calculates a collision risk of the subject vehicle to collide with an obstacle, and a collision avoidance unit performs a collision avoidance control according to the calculated collision risk.

7 Claims, 5 Drawing Sheets

(51) Int. Cl.

| | |
|---|---|
| *B60T 7/22* | (2006.01) |
| *B60T 8/58* | (2006.01) |
| *G08G 1/00* | (2006.01) |
| *G08G 1/052* | (2006.01) |
| *G08G 1/0965* | (2006.01) |
| *G08G 1/16* | (2006.01) |

(52) U.S. Cl.
  CPC ........... *G08G 1/052* (2013.01); *G08G 1/0965* (2013.01); *G08G 1/161* (2013.01); *G08G 1/166* (2013.01); *G08G 1/20* (2013.01); *B60T 2201/022* (2013.01); *B60T 2210/10* (2013.01); *B60T 2210/32* (2013.01); *B60T 2250/04* (2013.01)

(58) Field of Classification Search
  CPC ...... B60T 2250/04; B60Q 9/00; G08G 1/052; G08G 1/0965; G08G 1/161; G08G 1/166; G08G 1/20
  See application file for complete search history.

(56)                     References Cited

FOREIGN PATENT DOCUMENTS

| | | | |
|---|---|---|---|
| JP | 2015232787 A | * | 12/2015 |
| JP | 2018045303 A | | 3/2018 |
| JP | 2019040441 A | | 3/2019 |

* cited by examiner

FIG. 4

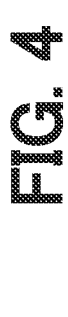

START

S210 WARNING INFO COMING FROM TARGET VEHICLE ?
— NO

YES

S220 TARGET VEHICLE IN SAME LANE ?
— NO

YES

S230 CALCULATE COLLISION RISK BASED ON VEHICLE SPEED/ INTER-VEHICLE DISTANCE

S240 COLLISION RISK > TH1 ?
— NO

YES

S250 AUTOMATIC BRAKING

S260 RING ALARM

END

S270 ANY OBSTACLE INFO ?
— NO

YES

S280 CALCULATE COLLISION RISK BASED ON VEHICLE SPEED/ INTER-VEHICLE DISTANCE AND OBSTACLE INFO

S290 COLLISION RISK > TH2 ?
— NO

YES

S300 AUTOMATIC BRAKING

S310 RING ALARM

WARNING INFO

WARNING INFO

WARNING INFO

DRIVING SUPPORT DEVICE FOR VEHICLE AND METHOD FOR THE SAME

CROSS REFERENCE TO RELATED APPLICATION

This application is a continuation application of International Patent Application No. PCT/JP2021/036216 filed on Sep. 30, 2021, which designated the U.S. and claims the benefit of priority from Japanese Patent Application No. 2020-170067 filed on Oct. 7, 2020. The entire disclosure of all of the above application is incorporated herein by reference.

TECHNICAL FIELD

The present disclosure relates to a vehicle driving support device suitable for avoiding a vehicle collision with another vehicle or an obstacle.

BACKGROUND ART

There has been known a driving support device for a vehicle, which is configured to, when a vehicle suddenly brakes, transmit warning information to surrounding vehicles by vehicle-to-vehicle communication, and, on a warning information reception vehicle, provide an alarm to an occupant, or automatically brake a vehicle.

However, the driving support device, when acquiring the information regarding danger from a vehicle in the detection area, performs a driving support such as an alarm without considering a cause of the sudden braking of the vehicle.

SUMMARY

According to one aspect of the present disclosure, a driving support device is mounted in a subject vehicle and configured to avoid a collisional accident. The driving support device includes: a communication device configured to perform wireless communication with an other vehicle; a vehicle information acquisition unit configured to acquire vehicle information including a position and a speed of the subject vehicle; an obstacle information acquisition unit configured to acquire obstacle information including a position and a speed of an obstacle that interferes with traveling of the subject vehicle; a sudden braking detection unit configured to detect a sudden braking by the subject vehicle; a warning information transmission unit configured to control the communication device to transmit warning information including the vehicle information and the obstacle information to the other vehicle when the sudden braking by the subject vehicle is detected by the sudden braking detection unit; a target vehicle determination unit configured to determine, when warning information transmitted from the other vehicle is received via the communication device, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle acquired by the vehicle information acquisition unit; a risk calculation unit configured to, when the target vehicle determination unit determines that the other vehicle that has transmitted the warning information is the warning target vehicle, calculate a collision risk of the subject vehicle to collide with the other vehicle or the obstacle based on the vehicle information regarding the other vehicle and obstacle information that are included in the warning information transmitted from the other vehicle; and a collision avoidance control unit configured to generate an alarm or to perform an automatic braking of the subject vehicle according to the collision risk calculated by the risk calculation unit. The driving support device further comprises a road condition acquisition unit acquiring a road condition in front of the subject vehicle. The risk calculation unit is configured to: determine, based on the road condition in front of the subject vehicle acquired by the road condition acquisition unit, whether the other vehicle that has transmitted the warning information and the subject vehicle are traveling in a same lane; calculate the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane; determine whether the obstacle is traveling toward a lane in which the subject vehicle is traveling based on a position and a speed of the obstacle acquired from the obstacle information included in the warning information transmitted from the other vehicle when the other vehicle and the subject vehicle are determined to be traveling in different lanes; and calculate an obstacle risk at which the subject vehicle collides with the obstacle based on the position and the speed of the obstacle and the position and the speed of the subject vehicle when the other vehicle is determined to be traveling toward the lane in which the subject vehicle is traveling, and the collision avoidance control unit is configured to generate the alarm or to perform the automatic braking of the subject vehicle according to the collision risk or the obstacle risk calculated by the risk calculation unit.

BRIEF DESCRIPTION OF THE DRAWINGS

FIG. 4 is a flowchart showing a warning information reception process performed by the control device;

DETAILED DESCRIPTION OF EMBODIMENTS

Figure 1:
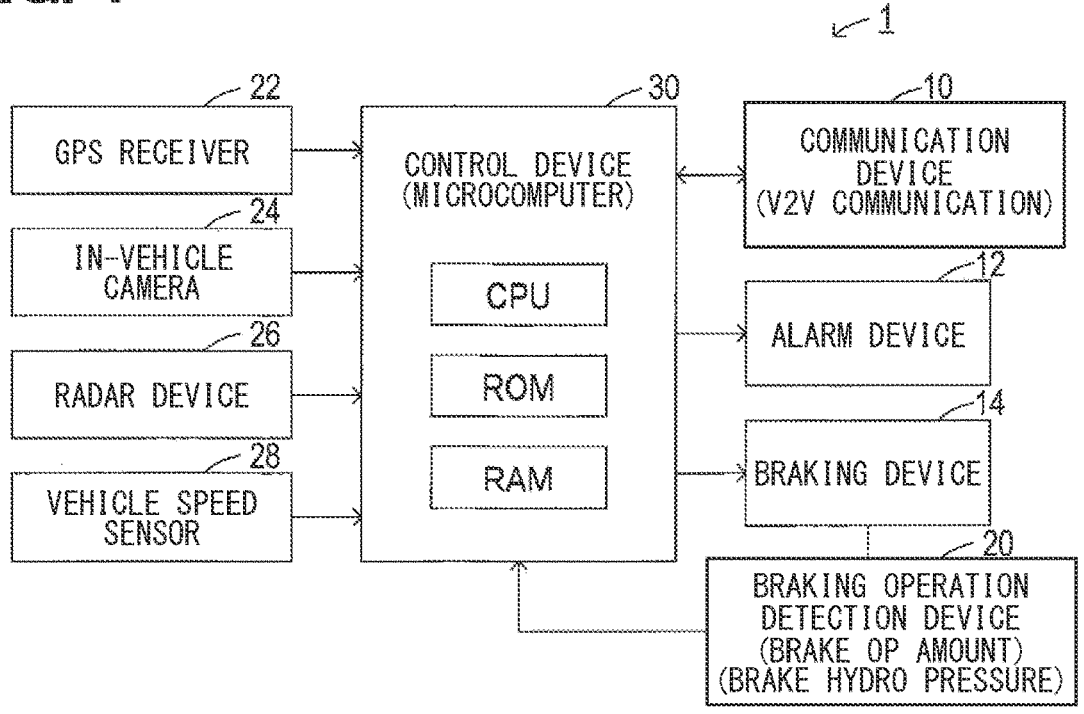
FIG. 1 is a block diagram showing a configuration of a driving support device for a vehicle according to an embodiment.

Next, a relevant technology will be described first only for understanding the following embodiments. A typical driving support device sets a warning information detection area based on a vehicle speed of a subject vehicle, an inclination angle of a traveling road, a weather, and the like, and selectively receives the warning information from other vehicle(s) that has suddenly braked in the detection area, for suppressing unnecessary driving support from being performed.

However, as a result of detailed examination by inventors, it was found, as an issue, that, in the driving support device described above, a driving support such as an alarm is always provided whenever receiving information regarding danger from the other vehicle in the detection area, since the detection area for the warning information is simply set for the vehicle that has the driving support device installed therein.

That is, the above-described driving support device, when acquiring the information regarding danger from a vehicle in the detection area, performs a driving support such as an alarm without considering a cause of the sudden braking of the vehicle. Therefore, when the other vehicle traveling in a lane different from that of the subject vehicle suddenly brakes to avoid an obstacle such as a ball jumping into the lane from one side close to the subject vehicle, the subject vehicle results in performing an unnecessary driving support, even though the subject vehicle is safely travelable.

It is preferably performed, in the present disclosure, to perform an appropriate driving support by a driving support device that is configured to perform a driving support such as ringing an alarm or the like upon receiving warning information transmitted from other vehicle that has suddenly braked, according to a cause of the sudden braking of the other vehicle.

According to a first aspect of the present disclosure, a driving support device is mounted in a subject vehicle and configured to avoid a collisional accident. The driving support device includes: a communication device configured to perform wireless communication with an other vehicle; a vehicle information acquisition unit configured to acquire vehicle information including a position and a speed of the subject vehicle; an obstacle information acquisition unit configured to acquire obstacle information including a position and a speed of an obstacle that interferes with traveling of the subject vehicle; a sudden braking detection unit configured to detect a sudden braking by the subject vehicle; a warning information transmission unit configured to control the communication device to transmit warning information including the vehicle information and the obstacle information to the other vehicle when the sudden braking by the subject vehicle is detected by the sudden braking detection unit; a target vehicle determination unit configured to determine, when warning information transmitted from the other vehicle is received via the communication device, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle acquired by the vehicle information acquisition unit; a risk calculation unit configured to, when the target vehicle determination unit determines that the other vehicle that has transmitted the warning information is the warning target vehicle, calculate a collision risk of the subject vehicle to collide with the other vehicle or the obstacle based on the vehicle information regarding the other vehicle and obstacle information that are included in the warning information transmitted from the other vehicle; and a collision avoidance control unit configured to generate an alarm or to perform an automatic braking of the subject vehicle according to the collision risk calculated by the risk calculation unit. The driving support device further comprises a road condition acquisition unit acquiring a road condition in front of the subject vehicle. The risk calculation unit is configured to: determine, based on the road condition in front of the subject vehicle acquired by the road condition acquisition unit, whether the other vehicle that has transmitted the warning information and the subject vehicle are traveling in a same lane; calculate the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane; determine whether the obstacle is traveling toward a lane in which the subject vehicle is traveling based on a position and a speed of the obstacle acquired from the obstacle information included in the warning information transmitted from the other vehicle when the other vehicle and the subject vehicle are determined to be traveling in different lanes; and calculate an obstacle risk at which the subject vehicle collides with the obstacle based on the position and the speed of the obstacle and the position and the speed of the subject vehicle when the other vehicle is determined to be traveling toward the lane in which the subject vehicle is traveling, and the collision avoidance control unit is configured to generate the alarm or to perform the automatic braking of the subject vehicle according to the collision risk or the obstacle risk calculated by the risk calculation unit.

According to a second aspect of the present disclosure, a driving support device that is mounted in a subject vehicle and configured to avoid a collisional accident. The driving support device includes: the communication device configured to perform wireless communication with an other vehicle; and at least one processor programmed to: acquire vehicle information including a position and a speed of the subject vehicle; acquire obstacle information including a position and a speed of an obstacle that interferes with traveling of the subject vehicle; detect a sudden braking by the subject vehicle; control the communication device to transmit warning information including the vehicle information and the obstacle information to the other vehicle when the sudden braking by the subject vehicle is detected; determine, when warning information transmitted from the other vehicle is received, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle; upon determining that the other vehicle that has transmitted the warning information is the warning target vehicle, calculate a collision risk of the subject vehicle to collide with the other vehicle or the obstacle based on the vehicle information regarding the other vehicle and obstacle information that are included in the warning information transmitted from the other vehicle; and generate an alarm or to perform an automatic braking of the subject vehicle according to the calculated collision risk. The at least one processor is further programmed to: acquire a road condition in front of the subject vehicle, determine, based on the acquired road condition in front of the subject vehicle, whether the other vehicle that has transmitted the warning information and the subject vehicle are traveling in a same lane; calculate the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane; determine whether the obstacle is traveling toward a lane in which the subject vehicle is traveling based on a position and a speed of the obstacle acquired from the obstacle information included in the warning information transmitted from the other vehicle when the other vehicle and the subject vehicle are determined to be traveling in different lanes; and calculate an obstacle risk at which the subject vehicle collides with the obstacle based on the position and the speed of the obstacle and the position and the speed of the subject vehicle when the other vehicle is determined to be traveling toward the lane in which the subject vehicle is traveling, and generate the alarm or to perform an automatic braking of the subject vehicle according to the calculated collision risk or the calculated obstacle risk.

According to a third aspect of the present disclosure, a method is performed by a driving support device that is mounted in a subject vehicle and configured to avoid a collisional accident. The method includes: performing wireless communication with an other vehicle; acquiring vehicle information including a position and a speed of the subject vehicle; acquiring obstacle information including a position and a speed of an obstacle that interferes with traveling of the subject vehicle; detecting a sudden braking by the subject vehicle; controlling the communication device to transmit warning information including the vehicle information and the obstacle information to the other vehicle when the sudden braking by the subject vehicle is detected; determining, when warning information transmitted from the other vehicle is received, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle; upon determining that the other vehicle that has transmitted the warning information is the warning target vehicle, calculating a collision risk of the subject vehicle to collide with the other vehicle or the obstacle based on the vehicle information regarding the other vehicle and obstacle information that are included in the warning information transmitted from the other vehicle; and generating an alarm or to perform an automatic braking of the subject vehicle according to the calculated collision risk. The method further includes: acquiring a road condition in front of the subject vehicle, determining, based on the acquired road condition in front of the subject vehicle, whether the other vehicle that has transmitted the warning information and the subject vehicle are traveling in a same lane; calculating the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane; determining whether the obstacle is traveling toward a lane in which the subject vehicle is traveling based on a position and a speed of the obstacle acquired from the obstacle information included in the warning information transmitted from the other vehicle when the other vehicle and the subject vehicle are determined to be traveling in different lanes; and calculating an obstacle risk at which the subject vehicle collides with the obstacle based on the position and the speed of the obstacle and the position and the speed of the subject vehicle when the other vehicle is determined to be traveling toward the lane in which the subject vehicle is traveling, generating the alarm or to perform an automatic braking of the subject vehicle according to the calculated collision risk or the calculated obstacle risk.

Here, the communication device is configured to perform wireless communication with other vehicle, and the vehicle information acquisition unit is configured to acquire vehicle information including a position and a speed of a subject vehicle.

Further, the obstacle information acquisition unit is configured to acquire obstacle information including a position and a speed of an obstacle that hinders a travel of the subject vehicle, and the sudden braking detection unit is configured to detect sudden braking of the subject vehicle.

Then, when sudden braking of the subject vehicle is detected by the sudden braking detection unit, the warning information transmission unit causes the communication device to transmit warning information including the vehicle information and the obstacle information to the other vehicle.

On the other hand, when the warning information transmitted from the other vehicle is received via the communication device, the target vehicle determination unit determines whether the other vehicle from which the warning information has been transmitted is a warning target vehicle existing in a warning target area.

That is, the target vehicle determination unit determines, based on (i) the vehicle information of the other vehicle included in the warning information received via the communication device and (ii) the vehicle information of the subject vehicle acquired by the vehicle information acquisition unit, whether or not the other vehicle that has transmitted the warning information exists in the warning target area.

Then, in case that it is determined by the target vehicle determination unit that the other vehicle that has transmitted the warning information is a warning target vehicle that exists in the warning target area, the risk calculation unit identifies a cause of the sudden braking of the other vehicle based on the vehicle information and the obstacle information included in the warning information.

For example, the cause of the sudden braking of the other vehicle may be identified as (i) a preceding vehicle existing as an obstacle in the same lane as the other vehicle, (ii) an obstructive object moving toward the other vehicle, or the like.

Then, the risk calculation unit calculates a risk of collision of the subject vehicle with the other vehicle or with the obstacle according to the identified cause of the sudden braking, and the collision avoidance control unit issues an alarm or performs an automatic braking according to the calculated risk.

As described above, the driving support device of the present disclosure, when receiving the warning information from the other vehicle existing in the warning target area, identifies a cause of the sudden braking based on the vehicle information and the obstacle information of the other vehicle included in the warning information, and performs driving support such as ringing an alarm, automatic braking, and the like.

Therefore, when the other vehicle suddenly brakes in a situation that (A) the subject vehicle is traveling in a lane different from that of the other vehicle and (B) no obstacle is moving from one side of the lane close to the other vehicle, it is possible to suppress an unnecessary driving support from being performed, for example.

Further, in a situation that (i) the subject vehicle is traveling in a lane different from that of the other vehicle and (ii) there is an obstacle moving from the lane of the other vehicle toward the subject vehicle, it is determined that (a) a cause of the sudden braking of the other vehicle is the obstacle, and (b) a driving support is provided because the obstacle interferes with the travel of the subject vehicle, for example.

Therefore, according to the driving support device for a vehicle of the present disclosure, when the other vehicle traveling in front of the subject vehicle suddenly brakes, it is possible to appropriately provide a driving support such as ringing an alarm, automatic braking, and the like, thereby avoiding uncomfortableness of the driver being caused by an unnecessary driving support.

Exemplary embodiments of the present disclosure are described with reference to the drawings.

[Configuration]

First, the configuration of a driving support device 1 of the present embodiment is described. The driving support device 1 is mounted on each of a plurality of vehicles constituting a driving support system.

As shown in FIG. 1, the driving support device 1 includes a communication device 10, an alarm device 12, a braking device 14, a braking operation detection device 20, a GPS receiver 22, an in-vehicle camera 24, a radar device 26, a vehicle speed sensor 28, and a vehicle speed sensor 28, and a control device 30.

The communication device 10 performs wireless communication with other vehicles around a subject vehicle. In the present embodiment, it is used to transmit and receive vehicle information indicating a speed and a position of the subject vehicle, warning information generated at the time of sudden braking of the vehicle, and the like.

The alarm device 12 generates an alarm (i.e., ring an alarm) to an occupant by voice output, image display, or the like. In the present embodiment, it is used to generate an alarm for collision prevention.

The braking device 14 is a so-called braking device that generates braking force on wheels. The braking device 14 is configured to be capable of generating a braking force not only by a brake operation by a driver but also by a braking control that raises a brake hydraulic pressure.

The braking operation detection device 20 detects an amount of operation of the braking device 14 by the driver and the brake hydraulic pressure. In the present embodiment, it is determined whether or not the subject vehicle is suddenly braking based on the amount of change in these parameters.

The GPS receiver 22 detects a current position, a moving speed, and the like of the vehicle based on radio waves transmitted from an artificial satellite. In the present embodiment, the GPS receiver 22 is used to detect a position and a speed of the vehicle. However, the vehicle speed sensor 28 and/or a gyro sensor may also be used to interpolate the detection results.

The in-vehicle camera 24 is used for capturing an image of the surroundings of the vehicle, and is composed of a CCD camera, a CMOS image sensor, a near-infrared camera, or the like. The in-vehicle camera 24 is used to detect obstacles and road conditions from captured images capturing a field in front of the vehicle in a traveling direction of the vehicle.

Obstacles include all objects that hinder or interfere with a travel of the vehicle, such as other vehicles traveling in front of the subject vehicle, fixed objects installed in front of the subject vehicle, objects crossing the front of the subject vehicle, and the like.

The radar device 26 is used for detecting a position of an obstacle, a distance to the obstacle, a relative speed with the obstacle, and the like, and is configured by using, for example, a millimeter-wave radar. In addition to the radar device 26, an obstacle may be detected by using a RiDAR or a sonar.

Further, since the radar device 26 can detect left and right walls and railing of the road in combination with the image captured by the in-vehicle camera 24, it is also used to measure a curvature of the road ahead in the traveling direction. Further, since an inclination angle of the traveling road can be detected from a reflected wave from a road surface, the radar device 26 is also used for measuring the inclination angle.

The vehicle speed sensor 28 detects the vehicle speed by measuring a rotation speed of the wheel or a drive shaft using, for example, an MER element.

Next, the control device 30 is composed of a microcomputer including a CPU and a semiconductor memory such as RAM, ROM, or the like, and is connected to each of the above parts.

Figure 2:
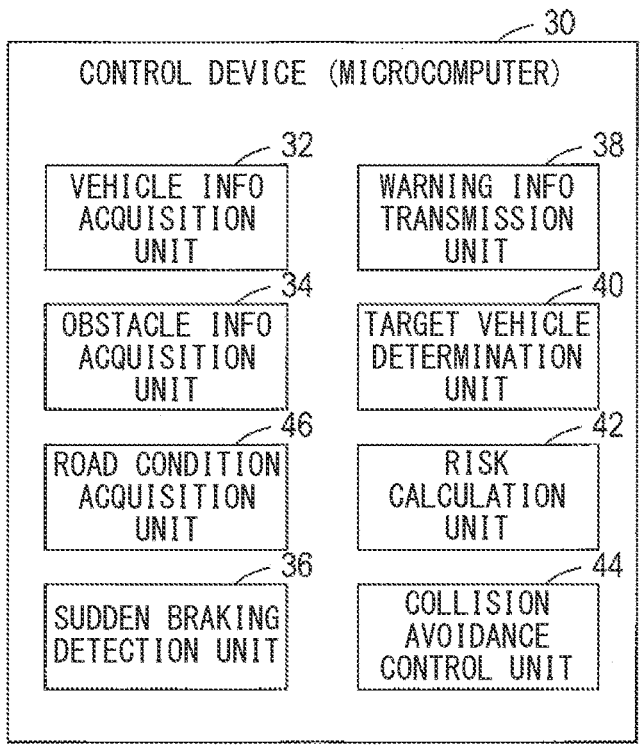
FIG. 2 is a block diagram showing a functional configuration of a control device.

As shown in FIG. 2, the control device 30 provides a function of each of a vehicle information acquisition unit 32, an obstacle information acquisition unit 34, a sudden braking detection unit 36, a warning information transmission unit 38, a target vehicle determination unit 40, a risk calculation unit 42, and a collision avoidance control unit 44, and a road condition acquisition unit 46.

The functions of each of the units 32 to 46 are realized by the CPU executing a program stored in a non-transitory, substantial recording medium. In this example, the semiconductor memory such as ROM, RAM or the like corresponds to the non-transitory, substantial recording medium in which a program is stored.

By executing such a program, a method corresponding to the program is performed. Note that the control device 30 may include one microcomputer or a plurality of microcomputers.

Here, the vehicle information acquisition unit 32 acquires a position and a speed of the subject vehicle as vehicle information based on input signals from the GPS receiver 22 and the vehicle speed sensor 28.

The obstacle information acquisition unit 34 acquires a position and a speed of the obstacle that hinders a travel of the vehicle as obstacle information based on the image captured in front of the vehicle by the in-vehicle camera 24 and the measurement results by the radar device 26.

The road condition acquisition unit 46 recognizes a lane of a road in front of the subject vehicle by using the image captured by the in-vehicle camera 24 and the measurement results by the radar device 26, and identifies a lane or lanes in which the subject vehicle and a preceding vehicle are traveling. The road condition acquisition unit 46 also measures a curvature and an inclination angle of the road.

[Control Process]

The functions of the vehicle information acquisition unit 32, the obstacle information acquisition unit 34, and the road condition acquisition unit 46 are realized by an information acquisition process that is repeatedly performed by the CPU at predetermined time intervals.

Figure 3:
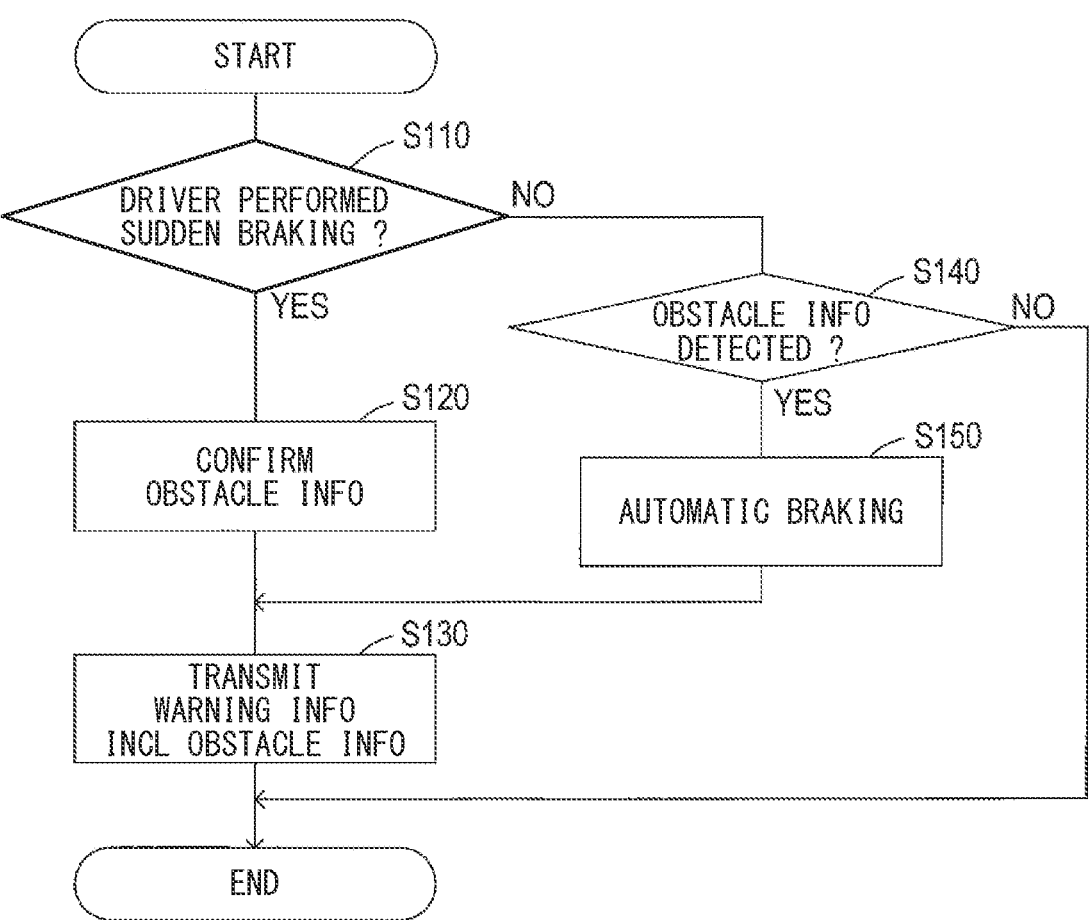
FIG. 3 is a flowchart showing a warning information transmission process performed by the control device.

The functions of the sudden braking detection unit 36 and the warning information transmission unit 38 are realized by the CPU repeatedly performing a warning information transmission process shown in FIG. 3 at predetermined time intervals.

In the warning information transmission process, first, in S110, based on a detection signal from the braking operation detection device 20, it is determined whether or not the subject vehicle is suddenly braking due to a braking operation of the driver.

Then, if it is determined that the subject vehicle is suddenly braking due to the driver's braking operation, the process proceeds to S120, and it is confirmed whether or not the obstacle information acquisition unit 34 has acquired the obstacle information at the time of sudden braking, and the process proceeds to S130.

On the other hand, if it is determined in S110 that sudden braking due to the driver's braking operation has not occurred, the process proceeds to S140, and it is determined whether or not the obstacle information acquisition unit 34 has acquired the obstacle information.

If it is determined in S140 that the obstacle information has been acquired, there is a possibility for the subject vehicle to collide with an obstacle. Thus, the process proceeds to S150, raising the brake hydraulic pressure, and operating the braking device 14 for performing an automatic braking of the subject vehicle, and the process proceeds to S130.

Then, in S130, the obstacle information confirmed in S120 or the obstacle information that has caused the automatic braking in S150 is transmitted from the communication device 10 together with the warning information, and the warning information transmission process is terminated.

If it is determined in S140 that the obstacle information has not been detected, the warning information transmission process is terminated without performing the process of S130.

It should be noted that, when the warning information is transmitted in S130, the vehicle information acquired by the vehicle information acquisition unit 32 is added to the warning information. Then, the warning information is transmitted from the communication device 10 together with the obstacle information.

In such manner, the warning information transmission process notifies the other vehicles around the subject vehicle of the sudden braking of the subject vehicle by causing the communication device 10 to transmit the warning information, when the subject vehicle is suddenly braking due to the driver's braking operation or due to the automatic braking accompanying a detection of an obstacle.

In the warning information transmission processing, the processing of S110 and S140 functions as the sudden braking detection unit 36, and the processing of S130 functions as the warning information transmission unit 38.

Next, the functions of the target vehicle determination unit 40, the risk calculation unit 42, and the collision avoidance control unit 44 are realized by the CPU performing a warning information reception process shown in FIG. 4.

The warning information reception process performs, first, in S210, a determination process which determines whether or not the warning information received by the communication device 10 is information transmitted from the other vehicle existing in a warning target area, which serves as the target vehicle determination unit 40.

That is, in S210, a warning target area for collision avoidance is set according to the speed of the subject vehicle acquired by the vehicle information acquisition unit 32, and the warning target area is adjusted or corrected according to a curvature and/or an inclination angle of the road acquired by the road condition acquisition unit 46.

Further, in S210, the position of the other vehicle that has transmitted the warning information is identified based on the vehicle information included in the warning information received by the communication device 10, and whether or not the other vehicle exists in the warning target area is determined. Since the warning target area can be set by the same procedure as described in Patent Document 1, detailed description thereof is omitted here.

When it is determined in S210 that the other vehicle that has transmitted the warning information is a warning target vehicle existing in the warning target area, the process proceeds to S220, and the traveling lane of the subject vehicle and the traveling lane of the warning target vehicle are acquired from the road condition acquisition unit 46.

Then, in S220, it is determined whether or not the warning target vehicle is traveling in the same traveling lane as the subject vehicle, based on the acquired traveling lane of each vehicle. If it is determined in S210 that the other vehicle that has transmitted the warning information is not the warning target vehicle, the warning information reception processing is terminated without performing the subsequent processing.

When it is determined in S220 that the subject vehicle and the warning target vehicle are traveling in the same lane, the process proceeds to S230, and a collision risk for the warning target vehicle is calculated based on the vehicle speed of the subject vehicle and the distance between the subject vehicle and the warning target vehicle. Note that the higher the vehicle speed is, the higher the collision risk becomes, and the shorter the distance is, the higher the collision risk becomes.

Next, in S240, it is determined whether or not the collision risk calculated in S230 is higher than a predetermined threshold value TH1.

When the collision risk is higher than the threshold value TH1, it is necessary to stop the subject vehicle promptly in order to avoid a collision. Therefore, the process proceeds to S250 to drive the braking device 14 to automatically brake the vehicle, and the warning information reception process is terminated.

When the collision risk is equal to or less than the threshold value TH1, the process proceeds to S260, and an alarm is generated by driving the alarm device 12 according to the collision risk (i.e., RING ALARM in S260), and the warning information reception process is terminated. That is, in S260, the driver is notified that there is a risk of collision, and the warning information reception process is terminated. In S260, when the collision risk is "0" or not more than the minimum value near "0", no alarm is generated.

Next, if it is determined in S220 that the subject vehicle and the warning target vehicle are traveling in different lanes, the process proceeds to S270, and it is determined whether or not the obstacle information indicating an obstacle causing the sudden braking is included in the warning information transmitted from the warning target vehicle.

Then, if it is determined in S270 that the obstacle information is not included, the warning information reception process is terminated because no collision with an obstacle is expected.

On the other hand, if it is determined in S270 that the obstacle information is included, the process proceeds to S280, and an obstacle risk is calculated based on the vehicle speed of the subject vehicle, the distance between the subject vehicle and the warning target vehicle, and the obstacle information acquired from the warning target vehicle.

The obstacle risk is calculated (i) by determining whether or not the obstacle is moving toward the traveling lane of the subject vehicle based on the position and the speed of the obstacle acquired from the obstacle information, and (ii) when it is determined that the obstacle is moving toward the traveling lane of the subject vehicle.

In other words, when the obstacle is moving away from the traveling lane of the subject vehicle, or when the obstacle is not existing in the traveling lane of the subject vehicle, the subject vehicle does not collide with the obstacle, thereby setting the obstacle risk to "0".

On the other hand, when the obstacle is moving toward the traveling lane of the subject vehicle, the obstacle may collide with the subject vehicle. Therefore, the collision possibility is calculated based on the position and the speed of the obstacle and the position and the speed of the subject vehicle, and the obstacle risk is set.

Then, in case that the obstacle risk is set in S280 as described above, the process proceeds to S290, and it is determined whether or not the obstacle risk is higher than a predetermined threshold value TH2.

When the obstacle risk is higher than the threshold value TH2, it is necessary to stop the subject vehicle promptly in order to avoid a collision with the obstacle. Therefore, the process proceeds to S300, the braking device 14 is driven for performing the automatic braking, and the warning information reception process is terminated.

When the obstacle risk is equal to or lower than the threshold value TH2, the process proceeds to S310, and an alarm is generated by driving the alarm device 12 according to the obstacle risk (i.e., RING ALARM in S310), and the warning information reception process is terminated. That is, in S310, the driver is notified that there is a risk of collision, and the warning information reception process is terminated. Note that, in S310, no alarm is generated when the obstacle risk is "0" or not more than the minimum value near "0".

In the warning information reception process, the processing of S220, S230, S270, and S280 functions as the risk calculation unit 42, and the processing of S240 to S260 and S290 to S310 functions as the collision avoidance control unit 44.

[Effects]

As described above, according to the driving support device 1 for a vehicle of the present embodiment, when the warning information is acquired from the driving support device 1 of the other vehicle that has suddenly braked in the warning target area, it is determined whether traveling lane of the subject vehicle is same as that of the other vehicle.

Figure 5A:
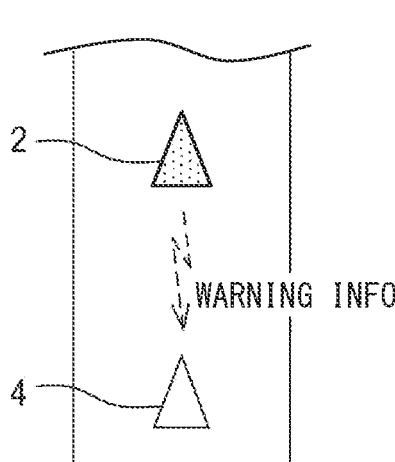
FIGS. 5A and 5B each is an explanatory diagram showing transmission/reception of warning information between vehicles traveling in a same lane.
Figure 5B:
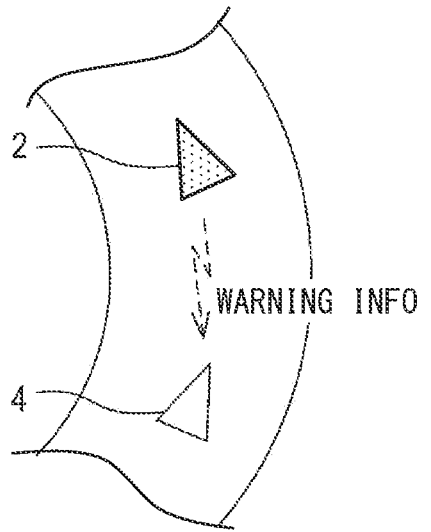

Then, as illustrated in FIGS. 5A and 5B, if the traveling lane of a subject vehicle 4 and the traveling lane of an other vehicle 2 are the same, the collision risk is calculated according to the vehicle speed of the subject vehicle 4 and the distance to the other vehicle 2. Then, according to the calculated collision risk, an alarm is generated or the automatic braking is performed to provide a collision avoidance control.

In addition, when the traveling lane is different from that of the other vehicle, it is determined whether or not the warning information acquired from the other vehicle has, added thereto, the obstacle information indicating the position and the speed of the obstacle that caused the sudden braking, and, if the obstacle information is not added thereto, the collision avoidance control based on the warning information is not performed.

Therefore, according to the driving support device 1 of the present embodiment, when the traveling lane is different from that of the other vehicle and there is no obstacle that may collide, the unnecessary collision avoidance control such as ringing an alarm can be suppressed.

In addition, if the traveling lane is different from that of the other vehicle, or if the obstacle information is being added to the warning information acquired from the other vehicle, the obstacle information is used to calculate the obstacle risk representing the risk of collision with the obstacle, and the collision avoidance control is performed according to the obstacle risk.

Therefore, the unnecessary collision avoidance control such as ringing an alarm is suppressed in a situation where there is no possibility of an obstacle to collide with the subject vehicle and when the obstacle risk is low.

Figure 6:
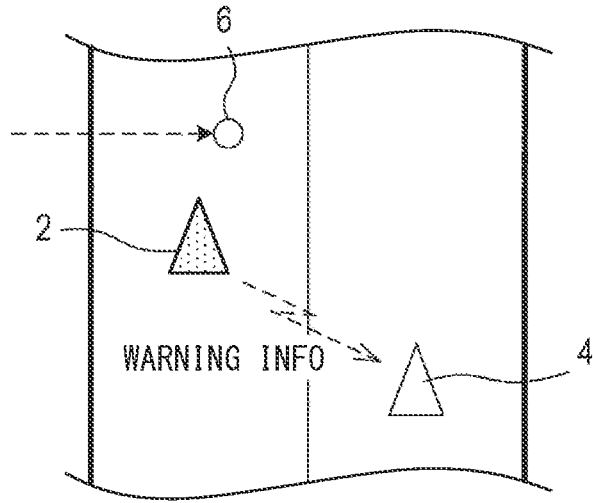
FIG. 6 is an explanatory diagram showing transmission/reception of the warning information between vehicles traveling in different lanes when a cause of sudden braking is an obstacle.
Figure 7:
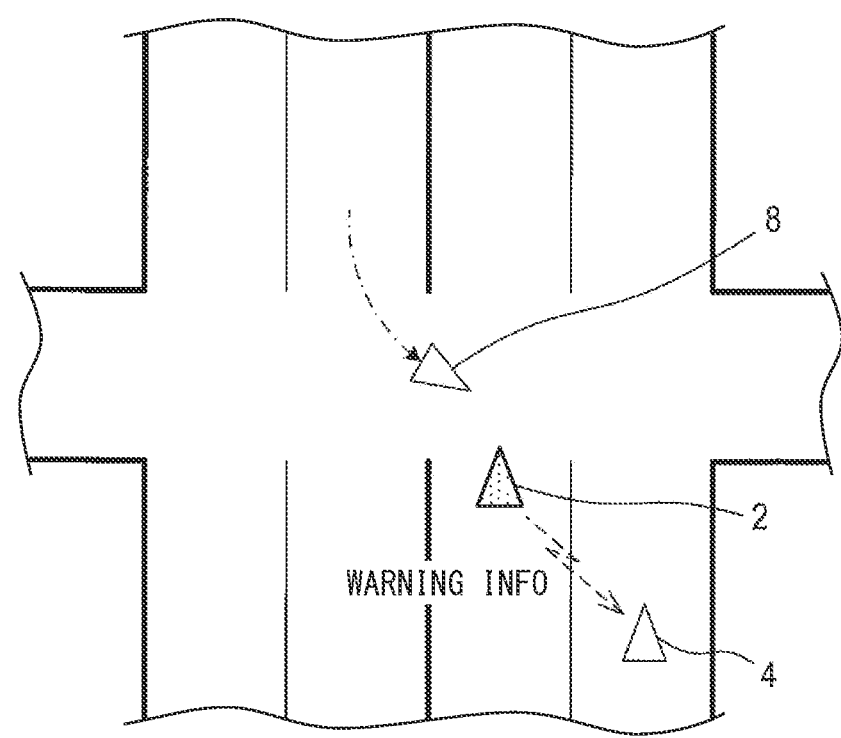
FIG. 7 is an explanatory diagram showing transmission/reception of the warning information between vehicles traveling in different lanes when a cause of sudden braking is an oncoming vehicle.

On the other hand, as illustrated in FIG. 6, when an object 6 runs across a front field of the other vehicle 2 to enter into the traveling lane of the subject vehicle 4, or as illustrated in FIG. 7, an oncoming vehicle 8 runs across a front field of the other vehicle 2 to enter into the traveling lane of the subject vehicle 4, the obstacle risk increases.

When the obstacle risk is high, the collision avoidance control is performed so that the subject vehicle 4 does not collide with the object 6 or the oncoming vehicle 8, thereby providing an appropriate driving support for the driver.

Further, in the present embodiment, when the automatic braking of the vehicle is performed in S250 and S300 of the warning information reception process, the sudden braking is performed for the subject vehicle. Further, when an alarm is rung in S260 and S310, the sudden braking of the subject vehicle is performed according to the braking operation of the driver.

When such a sudden braking occurs, the warning information including the obstacle information is transmitted in the warning information transmission process, thereby the warning information is sequentially transmitted to the following vehicles, and in each of the following vehicles, the collision avoidance control is properly performable.

Therefore, if the driving support device 1 of the present embodiment is mounted on a vehicle traveling on a road, it is possible to better suppress an occurrence of a collisional accident.

[Modification]

Although an embodiment of the present disclosure has been described in the above, the present disclosure is not limited to the above-described embodiment, and various modifications can be made.

For example, in the above embodiment, it has been described that the driving support device 1 of the suddenly braked vehicle transmits the obstacle information indicating the position and the speed of the obstacle that caused the sudden braking. However, if the obstacle is stopped (i.e., is standing still) in the traveling lane of the suddenly braked vehicle, driving support device 1 may be configured not to not transmit the obstacle information.

Further, in the above embodiment, when the traveling lane of the subject vehicle is different from the warning target vehicle from which the warning information has been transmitted, the collision avoidance control is not performed if it is determined that the obstacle information is not added to the warning information. However, even when the traveling lane of the subject vehicle is different from that of the warning target vehicle, a collision avoidance control such as an alarm may be performed if the curvature of the road is equal to or higher than a predetermined threshold value.

That is, when the subject vehicle is traveling on a steeply-curved road, it may roll over or slip due to the sudden braking and may enter into another lane from the currently-traveling lane. Therefore, when the curvature of the road is high, the collision avoidance control may be performed even when the subject vehicle is traveling in a lane that is different from the one of the suddenly-braking vehicle.

Next, the driving support device 1 and its method of the above-described embodiment may be realized by using a dedicated computer provided by configuring a processor and a memory programmed to perform one or more functions embodied by a computer program. Alternatively, the driving support device 1 and its method may be realized by using a dedicated computer provided by configuring a processor with one or more dedicated hardware logic circuits. Further, the driving support device 1 and its method may also be realized by one or more dedicated computers that are provided as a combination of (i) a processor and a memory programmed to perform one or more functions and (ii) a processor composed of one or more hardware logic circuits. Further, the computer program may be stored in a computer-readable, non-transitory, tangible storage medium as an instruction to be executed by the computer. Further, the driving support device 1 and the method thereof do not have to include software, and all the functions thereof may be realized by using one or more hardware devices.

In addition, multiple functions of a single element in the above embodiment may be realized by using multiple elements, or a single function provided by single element may be realized by multiple elements. Also, multiple functions of multiple elements may be realized by a single element, or a single function realized by multiple elements may be realized by a single component. A part of the configuration of the above-described embodiment may be omitted. Further, at least a part of the configuration of the above-described embodiment may be added to or replaced with the configuration of other embodiment(s) described above.

Further, in addition to the above-described driving support device 1, the present disclosure may also be realized in various forms, such as a system having the driving support device 1 as a component, a program for operating a computer as the driving support device 1, a non-transitory, tangible recording medium such as a semiconductor memory and the like in which the program is recorded, a display control method and the like.

What is claimed is:

1. A driving support device that is mounted in a subject vehicle and configured to avoid a collisional accident, the driving support device comprising:

a processor and a memory configured to:

perform wireless communication with an other vehicle;

acquire vehicle information including a position and a speed of the subject vehicle;

acquire obstacle information including a position and a speed of an obstacle that interferes with traveling of the subject vehicle;

detect a sudden braking by the subject vehicle;

transmit warning information including the vehicle information and the obstacle information to the other vehicle when the sudden braking by the subject vehicle is detected by the sudden braking detection unit;

determine, when warning information transmitted from the other vehicle is received, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle;

when determining that the other vehicle that has transmitted the warning information is the warning target vehicle, calculate a collision risk of the subject vehicle to collide with the other vehicle or the obstacle based on the vehicle information regarding the other vehicle and obstacle information that are included in the warning information transmitted from the other vehicle; and generate an alarm or to perform an automatic braking of the subject vehicle according to the collision risk, wherein the processor and the memory are further configured to:

acquire a road condition in front of the subject vehicle, determine, based on the road condition in front of the subject vehicle, whether the other vehicle that has transmitted the warning information and the subject vehicle are traveling in a same lane;

calculate the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane;

determine whether the obstacle is traveling toward a lane in which the subject vehicle is traveling based on an identification of a cause of a sudden braking of the other vehicle, and a position and a speed of the obstacle acquired from the obstacle information included in the warning information transmitted from the other vehicle when the other vehicle and the subject vehicle are determined to be traveling in different lanes;

calculate an obstacle risk at which the subject vehicle collides with the obstacle based on the position and the speed of the obstacle and the position and the speed of the subject vehicle when the other vehicle is determined to be traveling toward the lane in which the subject vehicle is traveling, generate the alarm or to perform the automatic braking of the subject vehicle according to the collision risk or the obstacle risk calculated, and when the obstacle is stopped in the traveling lane of the suddenly braking vehicle, the driving support device is configured not to transmit the obstacle information.

2. The driving support device according to claim 1, wherein the processor is configured to set the warning target area based on (i) the position and the speed of the subject vehicle and (ii) the road condition in front of the subject vehicle.

3. The driving support device according to claim 1, wherein the subject vehicle and the other vehicle are determined to be traveling only in different lanes.

4. The driving support device according to claim 1, wherein the processor is configured to acquire vehicle information and obstacle information in different lanes from which the subject vehicle is traveling.

5. The driving support device according to claim 1, wherein the processor is configured not to acquire vehicle information and obstacle information from the same lane in which the subject vehicle is traveling.

6. A driving support device that is mounted in a subject vehicle and configured to avoid a collisional accident, the driving support device comprising:

a communication device configured to perform wireless communication with an other vehicle; and at least one processor programmed to:

acquire vehicle information including a position and a speed of the subject vehicle;

acquire obstacle information including a position and a speed of an obstacle that interferes with traveling of the subject vehicle;

detect a sudden braking by the subject vehicle;

control the communication device to transmit warning information including the vehicle information and the obstacle information to the other vehicle when the sudden braking by the subject vehicle is detected;

determine, when warning information transmitted from the other vehicle is received, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle;

upon determining that the other vehicle that has transmitted the warning information is the warning target vehicle, calculate a collision risk of the subject vehicle to collide with the other vehicle or the obstacle based on the vehicle information regarding the other vehicle and obstacle information that are included in the warning information transmitted from the other vehicle; and generate an alarm or to perform an automatic braking of the subject vehicle according to the calculated collision risk, wherein the at least one processor is further programmed to:

acquire a road condition in front of the subject vehicle, determine, based on the acquired road condition in front of the subject vehicle, whether the other vehicle that has transmitted the warning information and the subject vehicle are traveling in a same lane;

calculate the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane;

determine whether the obstacle is traveling toward a lane in which the subject vehicle is traveling based on an identification of a cause of a sudden braking of the other vehicle, and a position and a speed of the obstacle acquired from the obstacle information included in the warning information transmitted from the other vehicle when the other vehicle and the subject vehicle are determined to be traveling in different lanes;

calculate an obstacle risk at which the subject vehicle collides with the obstacle based on the position and the speed of the obstacle and the position and the speed of the subject vehicle when the other vehicle is determined to be traveling toward the lane in which the subject vehicle is traveling;

generate the alarm or to perform an automatic braking of the subject vehicle according to the calculated collision risk or the calculated obstacle risk, and when the obstacle is stopped in the traveling lane of the suddenly braking vehicle, the driving support device is configured not to transmit the obstacle information.

7. A method performed by a driving support device that is mounted in a subject vehicle and configured to avoid a collisional accident, the method comprising:

performing wireless communication with an other vehicle;

acquiring vehicle information including a position and a speed of the subject vehicle;

acquiring obstacle information including a position and a speed of an obstacle that interferes with traveling of the subject vehicle;

detecting a sudden braking by the subject vehicle;

controlling the communication device to transmit warning information including the vehicle information and the obstacle information to the other vehicle when the sudden braking by the subject vehicle is detected;

determining, when warning information transmitted from the other vehicle is received, whether the other vehicle that has transmitted the warning information is a warning target vehicle existing in a warning target area based on (i) vehicle information regarding the other vehicle included in the warning information transmitted from the other vehicle and (ii) the vehicle information regarding the subject vehicle;

upon determining that the other vehicle that has transmitted the warning information is the warning target vehicle, calculating a collision risk of the subject vehicle to collide with the other vehicle or the obstacle based on the vehicle information regarding the other vehicle and obstacle information that are included in the warning information transmitted from the other vehicle; and generating an alarm or to perform an automatic braking of the subject vehicle according to the calculated collision risk, wherein the method further comprises:

acquiring a road condition in front of the subject vehicle, determining, based on the acquired road condition in front of the subject vehicle, whether the other vehicle that has transmitted the warning information and the subject vehicle are traveling in a same lane;

calculating the collision risk with the other vehicle based on a distance between the other vehicle and the subject vehicle that is acquired from the vehicle information regarding the subject vehicle and the vehicle information regarding the other vehicle and the speed of the subject vehicle acquired from the vehicle information regarding the subject vehicle when the other vehicle and the subject vehicle are determined to be traveling in a same lane;

determining whether the obstacle is traveling toward a lane in which the subject vehicle is traveling based on an identification of a cause of a sudden braking of the other vehicle, and a position and a speed of the obstacle acquired from the obstacle information included in the warning information transmitted from the other vehicle when the other vehicle and the subject vehicle are determined to be traveling in different lanes;

calculating an obstacle risk at which the subject vehicle collides with the obstacle based on the position and the speed of the obstacle and the position and the speed of the subject vehicle when the other vehicle is determined to be traveling toward the lane in which the subject vehicle is traveling;

generating the alarm or to perform an automatic braking of the subject vehicle according to the calculated collision risk or the calculated obstacle risk, and when the obstacle is stopped in the traveling lane of the suddenly braking vehicle, the driving support device is configured not to transmit the obstacle information.

\* \* \* \* \*